Patented Jan. 12, 1937

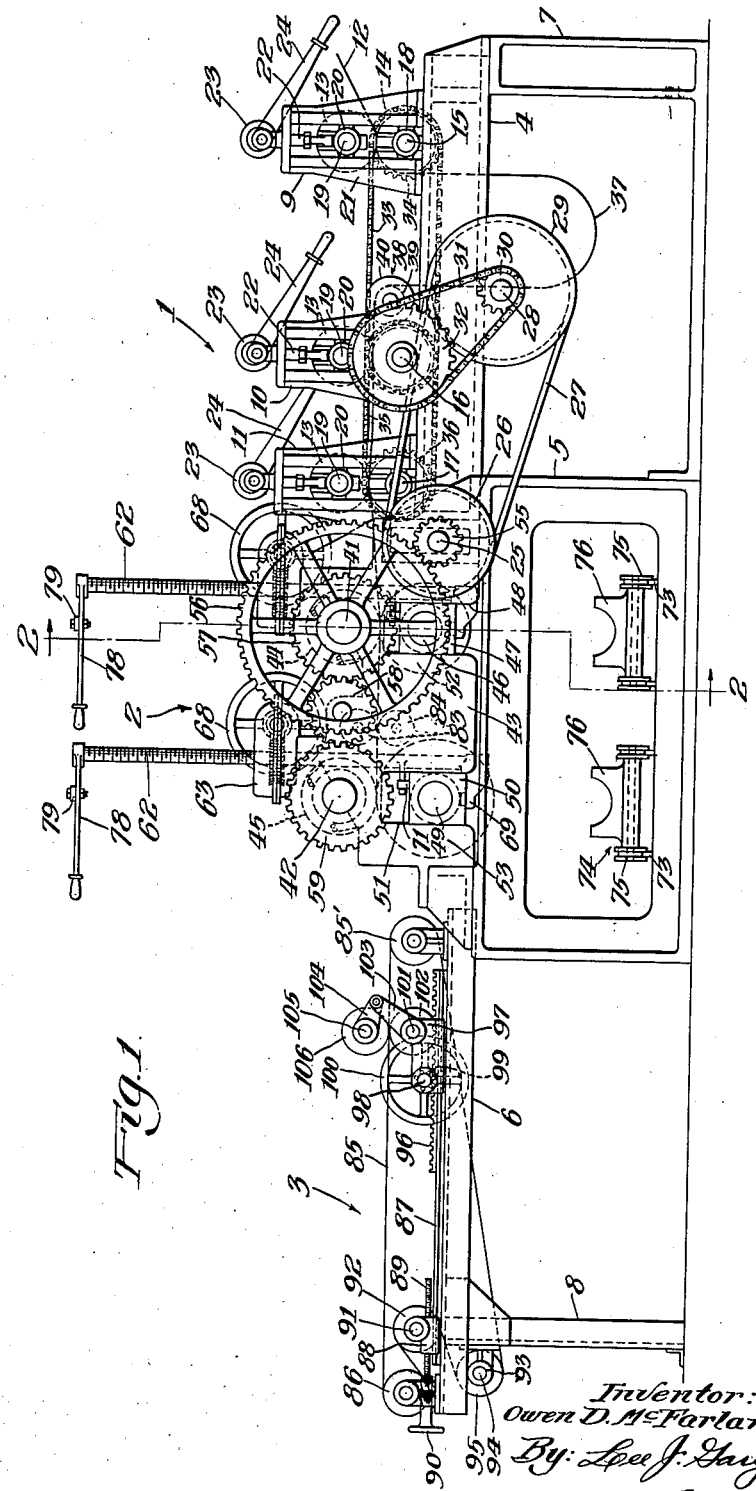

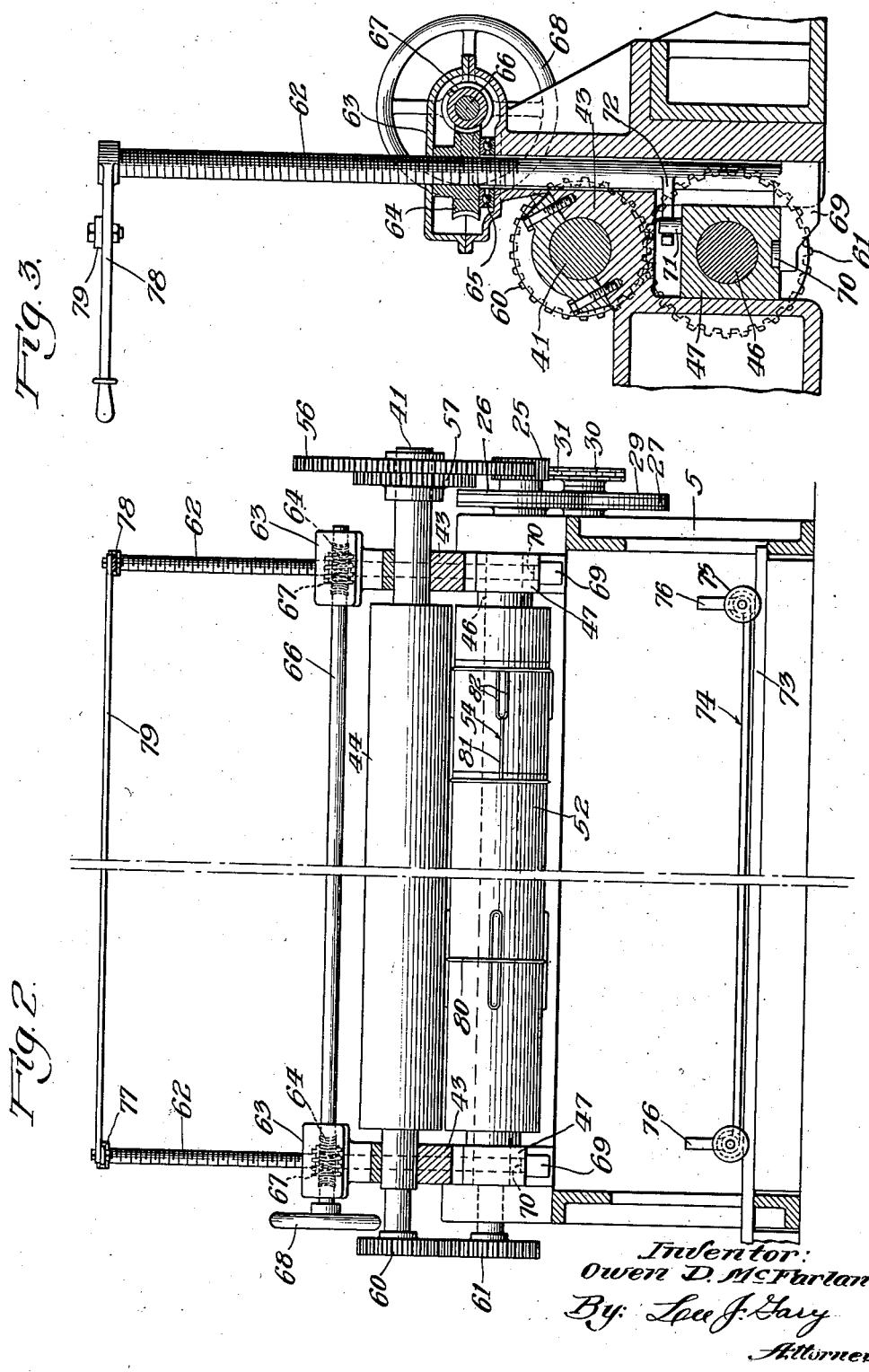

2,067,777

UNITED STATES PATENT OFFICE

2,067,777

MECHANISM FOR MOVABLY SUPPORTING CYLINDERS

Owen D. McFarland, Chicago, Ill., assignor to Roofing Machinery Mfg. Co., Chicago, Ill.

Application December 3, 1934, Serial No. 755,736

11 Claims. (Cl. 164—28)

This invention relates to improvements in a shingle cutting machine and refers specifically to a machine for continuously cutting and delivering roofing shingles of the type commercially known as strip shingles.

The objects and advantages of my invention will be apparent from the accompanying drawings and following detail description.

In the drawings, Fig. 1 is a side elevational view of the machine comprising my invention.

Fig. 2 is a transverse sectional view taken on line 2—2 of Fig. 1.

Fig. 3 is a detailed sectional view taken on line 3—3 of Fig. 2.

Referring in detail to the drawings, the machine comprising my invention may include a feed section 1, a cutter section 2 and a delivery section 3, the various instrumentalities comprising said sections being respectively mounted upon frame 4, structure 5 and frame 6, frames 4 and 6 being respectively supported at their ends by uprights or columns 7 and 8.

Draw units 9, 10 and 11 may be mounted upon frame 4 and may be adapted to feed a continuous web 12 of relatively flexible roofing material from a source of supply, not shown, to the cutter section 2. The draw units 9, 10 and 11 may be of similar construction and each may comprise an upper and lower draw roll 13 and 14 respectively. The lower rolls 14 of the units 9, 10 and 11 may be carried respectively upon shafts 15, 16 and 17, each of which may be journalled in bearings 18. The upper draw rolls may be mounted upon shafts 19 which may be journalled in bearings 20. Bearings 18 and 20 may be carried by the frame members or standards 21, bearings 18 in each instance being fixed with respect to the standards 21 and bearings 20 being vertically adjustable.

Rods 22 in each of the units 9, 10 and 11 may be connected to bearings 20, said rods at their upper ends being operatively associated with an eccentric mechanism 23. A handle 24 may be utilized to operate the eccentric mechanism 23 whereby rods 22 may be raised or lowered. It can readily be seen, that inasmuch as rods 22 are connected at their lower ends to bearings 20, rolls 13 may be raised or lowered with respect to the lower rolls 14, and by the provision of the eccentric mechanisms 23 these operations may be quickly and conveniently performed.

A prime mover such as an electrical motor, gasoline engine or the like (not shown) may be connected to shaft 25. A pulley 26 may be mounted upon shaft 25 and a belt 27 may be trained over said pulley. A shaft 28 may be journalled in and carried by frame 4 and, in turn, may carry a pulley 29 which is adapted to be driven by belt 27. If desired, the operative connections between shaft 25 and shaft 28 may comprise a change speed mechanism, such as the usual Reeves drive (not shown), whereby the angular velocity of shaft 28 may be changed with respect to the rotative speed of shaft 25.

A sprocket wheel 30 may be mounted upon shaft 28 and may drive sprocket chain 31 which, in turn, may pass over sprocket wheel 32 mounted upon shaft 16 of draw unit 10. A pair of sprocket wheels, not shown, may be mounted upon the opposite end of shaft 16, one of said wheels being adapted to drive chain 33 which passes over and drives sprocket wheel 34 mounted upon shaft 15. The other sprocket wheel upon shaft 16 drives chain 35 which passes over and drives sprocket wheel 36 mounted upon shaft 17.

Web 12 may represent any type of roofing material, and usually comprises felt or other fibrous material which has been saturated or impregnated with a water-proofing material such as asphalt or the like. It is to be understood, of course, that I do not wish to be limited to a specific type of roofing material to be operated upon inasmuch as the concepts of my invention are adaptable to substantially any type of roofing material from which so called strip shingles may be manufactured.

As has been hereinbefore described, web 12 may be drawn from a source of supply (not shown), which may be a roll of roofing material or may comprise the web passing from the looper of a saturating machine. Web 12 may be threaded between rolls 13 and 14 of unit 9, and inasmuch as roll 14 is driven, said web will be carried through the unit in a continuous manner. To eliminate excessive tension in the web prior to passing the same to the cutter section 2, the web 12, after passing through unit 9, may be looped as shown at 37 in Fig. 1, the web subsequently being carried over guide member 38, which may comprise a cylindrical surface 39 having flanges 40 at each end thereof.

The flanges 40 may define a distance along the cylindrical surface 39 equal to the width of web 37, and the upper surface of the cylindrical member 39 may be in substantially the same horizontal plane as the nip of rolls 13 and 14 of the draw unit 10. After passing over the guide member 38, web 12 may be threaded between rolls 13 and 14 of the draw unit 10 and thereafter said web may be passed between rolls 13 and 14 of the draw unit 11. In this manner web 12 is carried by the feed section 1 to the cutter section 2.

Shafts 41 and 42 may be journalled in the superstructure 43 which may be mounted upon the upper portion of structure 5. Shaft 41 may carry bed roll 44 and shaft 42 may carry a similar bed roll 45. A shaft 46 may be journalled in bearings 47 which, in turn, may be slidably positioned within openings 48 provided in the lower portion of superstructure 43, shaft 46 being positioned immediately beneath shaft 41. In a similar manner shaft 49 may be carried by bearings 50 which, in turn, may be slidably positioned within openings 51 provided in the structure 43, shaft 49 being positioned immediately beneath shaft 42. A cutting cylinder 52 may be carried by shaft 46 and in like manner a cutting cylinder 53 may be carried on shaft 49. The cutting blades 54 of cylinder 52 being adapted to cut the web in a desired manner, as will be hereinafter more fully described.

A gear 55 may be mounted upon the end of shaft 25 and may be adapted to mesh with gear wheel 56 which may be carried upon the end of shaft 41. A gear 57 may also be mounted upon shaft 41 and may mesh with idle gear 58 which, in turn, meshes with gear 59 mounted upon shaft 42. In this manner bed rolls 44 and 45 may be driven from the power shaft 25. A spur gear 60 may be mounted upon the opposite end of shaft 41 and may mesh with spur gear 61 carried upon the end of shaft 46. The diameters of gears 60 and 61 are in the same ratio as the diameters of bed roll 44 and cutting cylinder 52 and, consequently, the peripheral speeds of the cutting roll and bed roll are equal, both rolls being positively driven. A similar arrangement obtains with respect to shafts 42 and 49 whereby bed roll 45 and cutting cylinder 53 operate at equal peripheral speed.

In operation, web 12 may be passed from section 1 and may be threaded between bed roll 44 and cutting cylinder 52 and by means of knives 54 mounted upon the cutting cylinder, the web 12 may be severed in a desired manner. The knives shown in Fig. 2, for purposes of illustration, are adapted to cut the web in the form of a plurality of strip shingles, each shingle having a plurality of tabs. It is to be understood, of course, that the knives mounted upon cutting cylinder 52 may take any suitable form in order to sever the web in a desired manner.

In the operation of a machine of the character described, it is desirable that the machine be run in a continuous manner inasmuch as web 12 is usually taken from the loopers of a saturating machine or the driers of a paper making machine. It can readily be seen that if the cutting machine is rendered inoperative for a period of time, the saturating device or the web forming device from which web 12 is taken, must be stopped in order to prevent an excess length of web accumulating. It can readily be seen therefore, that if the knives on a cutting cylinder break, or said knives become too dull to sever the web in a proper manner, the cylinder must be replaced. Heretofore, it has been necessary to stop the cutting operation and remove and repair the cutting cylinder. In stopping the operation of the cutting machine, devices which previously operate upon the web must of necessity be stopped. This, of course, has been highly undesirable being a source of economic waste.

As a feature of my invention, I provide means whereby a cutting cylinder may be quickly and conveniently changed. In addition, I have provided alternately operating cutting units whereby one unit may be thrown into operation when the other unit is rendered inoperative to remove or replace a damaged cutting cylinder. The device is capable of performing a series of operations upon a continuously passing web, for instance, cutting cylinder 52 may cut apertures in the web whereas cylinder 53 may sever the web longitudinally and/or transversely. Hence, it can readily be seen that my device may operate in an alternate manner in order to insure continuous operation, or cylinders 52 and 53 instead of being identical and being alternately operable, may be devised to perform a different operation upon a continuously advancing web.

A screw 62 may be associated with each of the bed rolls 44 and 45, said screws being slidably positioned in the superstructure 43, being vertically disposed therein. A housing 63 may be mounted at the upper portion of superstructure 43 and contained therein may be a worm wheel 64, the inner bore of the worm wheel being threadedly connected to the threaded portion of screw 62. Worm wheel 64 may be supported by thrust bearing 65 which, in turn, may rest upon the upper portion of the superstructure within housing 63. There may be two screws 62 associated with each of the cutting units, said screws being at transversely opposite sides of the superstructure. A shaft 66 may be positioned transversely across the machine and may be journalled at each end in housing 63. A pair of worm gears 67 may be mounted upon each shaft 66, each worm gear being adapted to mesh with a worm wheel 64. A hand wheel 68 may be mounted upon one end of shaft 67 whereby said shaft may be rotated.

The arrangement is such that upon rotation of shaft 66, worm wheels 64 will be rotated. Inasmuch as each of the worm wheels 64 is threadedly associated with a screw 62, said screw will be raised or lowered depending upon the direction of travel of hand wheel 68. A ledge or projection 69 may be carried at the lower end of each of the screws 62, said ledges extending at substantially right angles to each screw. Each of the ledges 69, may be provided with a circular boss 70 which may be disposed upon the face of the ledge. The ledges 69 are adapted to support the movable bearings 47 and/or 50, the lower surfaces of the bearings being provided with indentations which may register with the circular bosses 70 upon the upper faces of the ledges. It can readily be seen that the bearings 47 and 50 are thus suspended upon the lower ends of screws 62 and each pair of bearings 47 or 50, may be raised or lowered by the proper manipulation of the appropriate hand wheel 68.

In operation, if, for instance, it is desired to remove cutting cylinder 52 from the machine, hand wheel 68 may be so rotated as to cause screw 62 associated with bearings 47 to travel downwardly. A pin 71 may be mounted upon the upper portion of each of the bearings 47 and an integral hook member 72 may extend from each of the screws 62 whereby bearings 47 may be firmly supported upon the ends of screw 62 when said bearings have been lowered from slots or apertures 48 in the superstructure 43.

Tracks 73 may be positioned upon the inner lower portion of frame 5, said tracks transversely spanning said frame. Trucks 74 having wheels 75 may be mounted upon tracks 73, each end of each of the trucks being provided with a cradle or trunnion 76.

When screws 62 have been lowered a predetermined distance, cutting cylinder 52 will be positioned between trunnions 76, the arcuate portions of said trunnions receive and support shaft 46. When shaft 46 thus rests upon trunnions 76, screws 62 may be lowered a further distance until bosses 70 are disengaged from the indentations in the lower faces of bearings 47.

At this phase of the operation, screws 62 may be rotated through an angle of approximately 90° until ledges 69 are swung from beneath bearings 47. A bar 77 may be rigidly mounted upon the upper end of the rear screw 62 and a lever 78 may be similarly mounted upon the upper ends of the front screw 62. A tie rod 79 may connect bar 77 and lever 78 whereby said screws may be rotated in unison.

It is to be understood, of course, that the instrumentalities herein described as being associated with bearings 47 and cutting cylinder 52 are identical in construction with the instrumentalities associated with bearings 50 and cutting cylinder 53, and for the sake of expediency in describing the structures, the same reference numerals are applied to the identical elements. As has been hereinbefore described, when cutting cylinder 52 has been removed from the machine, cutting cylinder 53 which may be identical in construction and function to cutting cylinder 52, may be immediately put into operation thereby maintaining continuous operation and passage of the web 12. If cutting cylinders 52 and 53 are identical, when cutting cylinder 53 becomes inoperative, a new cylinder 52 may be brought into operation in a manner as has been hereinbefore described.

Cylinders 52 and/or 53 may sever the web longitudinally by means of knives 80, for instance. In addition, the individual strips thus cut may be severed transversely by means of knives 81 and 82. The individual units, if cylinder 52 is considered the operative cylinder, are passed from between cylinder 52 and roll 44 to draw rolls 83 and 84. If the cutting unit comprising cylinder 52 is inoperative and the cutting unit comprising cylinder 53 is rendered operative, the web is passed between draw rolls 83 and 84, and subsequently advanced between cylinder 53 and bed roll 45, the web being cut in an appropriate desired manner by cylinder 53.

The unit strips thus cut may be carried to the delivery section 3. The delivery section may comprise pulleys or drums 85' and 86 positioned at opposite ends of frame 6 over which a conveyor belt 87 may be trained. Guide rails 87 may be mounted upon the upper portion of frame 86 and bearing blocks 88 may be slidably mounted upon said guide rails, said blocks being movable along said rails by means of a screw 89 which may be threadedly associated with blocks 88, said screw being operated by hand wheel 90. Bearing blocks 88 may support shaft 91 upon which may be mounted drum 92. Bearings 93 may be mounted upon columns 8 and may carry shaft 94 upon which may be mounted drum 95. Conveyor belt 85 in passing over drums 85' and 86, is trained around drums 92 and 95 in such a manner that by properly manipulating hand wheel 90, drum 92 may be so moved as to either increase or decrease the tension of belt 85.

Racks 96 may be mounted upon the upper portion of frame 6 and blocks 97 may be slidably positioned upon guide rails 87, a shaft 98 being journalled in blocks 97, said shaft, in turn, carrying pinions 99 which mesh with racks 96. A hand wheel 100 may also be mounted upon shaft 98, the proper manipulation of which will move block 97 longitudinally along guide rails 87. A shaft 101 may be journalled in blocks 97, said shaft carrying draw roll 102. Arms 103 may be carried by blocks 97 and arms 104 may be pivotally connected to the outer ends of arms 103. Arms 104 at their opposite ends may carry shaft 105 upon which may be mounted draw roll 106, the arrangement being such that draw roll 106 is mounted immediately above draw roll 102 and belt 85 passes therebetween.

In operation, the unit strips delivered from the cutting section 2 may be passed to belt 85, said strips being inserted between draw rolls 102 and 106. Thereafter the strips are carried upon the belt 85 to the end of said belt where the same may be delivered to a suitable receptacle or stacking means (not shown). By the proper manipulation of hand wheel 100, blocks 97 and hence rolls 102 and 106 may be brought toward or away from the cutting unit 2, depending upon the length of the unit strips cut by the cutting unit. If the strips are relatively long, rolls 102 and 106 will be moved a relatively great distance from the cutting section and if the strips are relatively short, the rolls 102 and 106 will be moved closer to the cutting section.

Although my invention has been described in conjunction with the operation of cutting a web of roofing material to form strip shingles, it is to be understood that the same in its broadest concept contemplates the provision of means for quickly and conveniently removing or mounting a cylinder or roll, regardless of its function, in operative juxtaposition with respect to another roll or cylinder.

I claim as my invention:

1. In combination with a device for feeding, cutting, and delivering the cut portions of a continuously advancing flexible web wherein the cutting stage comprises a rotating cutting cylinder mounted upon bearings and a superimposed rotating bed roll, of means for removably supporting the cutting cylinder in operative position adjacent the bed roll which comprises, a pair of vertically positioned supporting members, lugs at the lower ends of said members upon which the cutting cylinder bearings are removably supported and means for moving said supporting members vertically to change the distance between the bed roll and cutting cylinder.

2. In combination with a device for feeding, cutting, and delivering the cut portions of a continuously advancing flexible web wherein the cutting stage comprises a rotating cutting cylinder mounted upon bearings and a superimposed rotating bed roll, of means for removably supporting the cutting cylinder in operative position adjacent the bed roll which comprises, a pair of vertically positioned screws, lugs at the lower ends of said screws upon which the cutting cylinder bearings rest and means threadedly engaged with said screws for moving said screws axially to change the distance between the bed roll and cutting cylinder.

3. In combination with a device for feeding, cutting and delivering the cut portions of a continuously advancing flexible web wherein the cutting mechanism is mounted in a frame and comprises, a rotating cutting cylinder mounted upon bearings movable in said frame and a superimposed rotating bed roll mounted upon bearings fixed in said frame, of means for removably supporting the cutting cylinder in operative position adjacent the bed roll which comprises, a pair of vertically positioned supporting members, lugs at the lower ends of said supporting members upon which said cutting cylinder bearings rest, and means for moving said supporting members vertically to move said cutting cylinder into or out of said frame.

4. In combination, a frame, a bed roll journalled in said frame, an operating cylinder normally positioned beneath said bed roll, bearings on which said cylinder is mounted, said bearings being movably positioned in said frame, and means mounted in said frame for removing said cylinder and cylinder bearings from said frame.

5. In combination, a frame, a bed roll journalled in said frame, an operating cylinder normally positioned beneath said bed roll, bearings on which said cylinder is mounted, said bearings being movably positioned in said frame, and means mounted in said frame for removing said cylinder and cylinder bearings together from said frame.

6. In combination, a frame, a bed roll journalled in said frame, an operating cylinder normally positioned beneath said bed roll, bearings on which said cylinder is mounted, said bearings being movably positioned in said frame, and means mounted in said frame for moving said cylinder and cylinder bearings out of said frame comprising supporting members vertically movable in said frame, and means at the lower ends of said supporting members upon which said cylinder bearing rest.

7. In combination, a frame, a bed roll journalled in said frame, an operating cylinder normally positioned beneath said bed roll, bearings on which said cylinder is mounted, said bearings being movably positioned in said frame, and means mounted in said frame for moving said cylinder and cylinder bearings out of said frame comprising vertically positioned screws mounted in said frame and means in said frame threadedly engaged with said screws for moving said screws axially.

8. In combination, a frame, a bed roll journalled in said frame, an operating cylinder normally positioned beneath said bed roll, bearings on which said cylinder is mounted, said bearings being movably positioned in said frame, and means mounted in said frame for moving said cylinder and cylinder bearings out of said frame comprising a pair of vertically movable screws mounted in said frame and means threadedly engaged with said screws for moving said screws axially.

9. In combination, a frame, a bed roll journalled in said frame, an operating cylinder normally positioned beneath said bed roll, bearings on which said cylinder is mounted, said bearings being movably positioned in said frame, and means mounted in said frame for moving said cylinder bearings out of said frame comprising a pair of vertically positioned supporting members, lugs at the lower ends of said supporting members upon which said cylinder bearings rest, means mounted upon said frame for moving said supporting members vertically to remove said cylinder from said frame, and means for revolving said supporting members to swing said lugs from beneath said cylinder bearings.

10. In combination, a frame, a bed roll journalled in said frame, an operating cylinder normally positioned beneath said bed roll, bearings on which said cylinder is mounted, said bearings being movably positioned in said frame, and means mounted in said frame for moving said cylinder bearings out of said frame comprising a pair of vertically positioned screws, lugs carried at the lower ends of said screws upon which said cylinder bearings rest, means mounted upon said frame threadedly associated with said screw to move said screws axially and remove said cylinder from said frame, and means for rotating said screws in unison to swing said lugs from beneath said cylinder bearings.

11. In combination, a frame, a bed roll journalled in same frame, an operating cylinder normally positioned beneath said bed roll, bearings on which said cylinder is mounted, said bearings being movably positioned in said frame, and means mounted in said frame for moving said cylinder bearings out of said frame comprising a pair of vertically positioned screws, lugs carried at the lower ends of said screws upon which said cylinder bearings rest, means mounted upon said frame threadedly associated with said screw to move said crews axially and remove said cylinder from said frame, and means for rotating said screws to swing said lugs from beneath said cylinder bearings.

OWEN D. McFARLAND.